(No Model.) 3 Sheets—Sheet 1.

G. YULE & W. A. BAGLIN.
MACHINE FOR WRINGING HATS.

No. 483,823. Patented Oct. 4, 1892.

Attest:
L. Lee.
Edw. F. Kinsley

Inventors.
G. Yule and W. A. Baglin,
per Crane & Miller, Attys.

(No Model.) 3 Sheets—Sheet 3.

G. YULE & W. A. BAGLIN.
MACHINE FOR WRINGING HATS.

No. 483,823. Patented Oct. 4, 1892.

Attest:
L. Lee.
E. Kinsey.

Inventors.
G. Yule and W. A. Baglin,
per Crane & Miller, Attys.

ed here, but rather to develop the shape and size of the hat according to the form and dimensions of the rim.

UNITED STATES PATENT OFFICE.

GEORGE YULE, OF NEWARK, NEW JERSEY, AND WILLIAM A. BAGLIN, OF NEW YORK, N. Y.

MACHINE FOR WRINGING HATS.

SPECIFICATION forming part of Letters Patent No. 483,823, dated October 4, 1892.

Application filed October 16, 1891. Serial No. 408,906. (No model.)

*To all whom it may concern:*

Be it known that we, GEORGE YULE, residing at Newark, Essex county, New Jersey, and WILLIAM A. BAGLIN, residing in the city, county, and State of New York, citizens of the United States, have invented certain new and useful Improvements in Machines for Wringing Hats, fully described and represented in the following specification and the accompanying drawings, forming a part of the same.

This invention relates to an improved means for wringing hat-bodies, whereby the edge of the body is shaped to a given form and size while in a moist and yielding condition. Such an effect is produced upon the edge of the body by means of a rim of the desired size and shape, against which the body is expanded by the centrifugal force.

In wringing flat hat-bodies, as hereinafter described, an oval rim may be used in case the edge of the body is oval, and the rim then operates to grasp the body and rotate the same. The centrifugal force operating upon the hat-body and distending the brim would stretch the hat unequally, owing to slight variations in the density of the felt, were it not for the surrounding rim, which is proportioned to the size of the hat-body in such manner as to restrain any expansion beyond the desired size. The rim thus regulates the diameter of the hat-brim and fixes the shape of its border. By these means a series of hat-bodies of great uniformity is readily secured, and such uniformity greatly promotes the mechanical treatment of the hats by other machinery—as, for instance, the sticking of nap-bats to the bodies, in which operation bats of uniform size require bodies shrunk with great uniformity to fit such nap-bats accurately. After hat-bodies are napped and dyed it is also desirable to dry them by centrifugal means, while preserving the desired shape and size of the brim, all of which may be effected by the means described herein. The carrier, with rim at the circumference and a cap or socket fitted to the center of the body, may also be used to flange or bend the brims of a series of conical hat-bodies and at the same time shape their peripheries uniformly.

Figure 1:
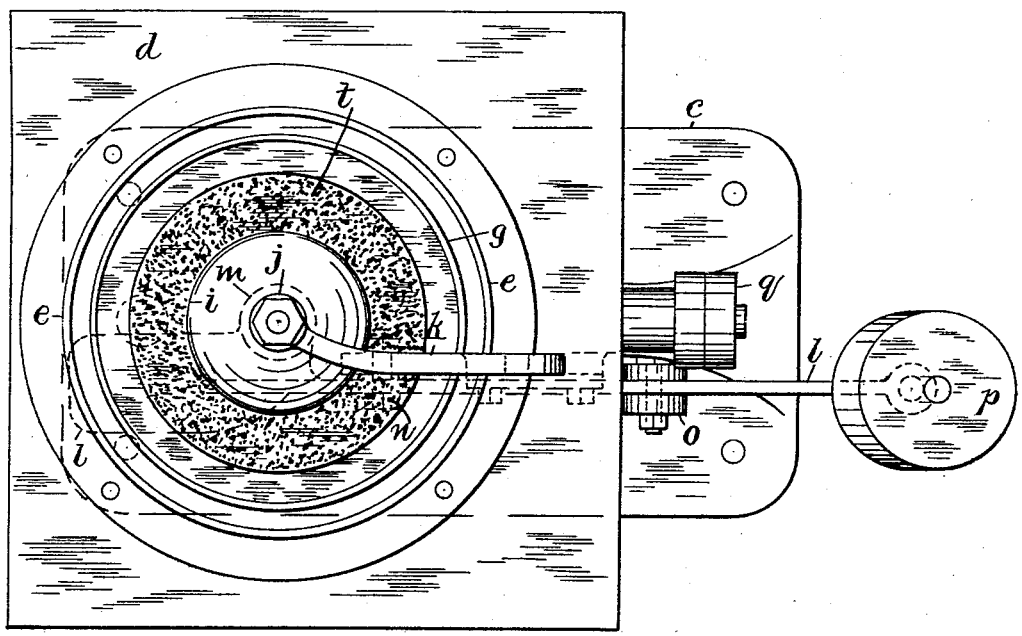
Figure 2:
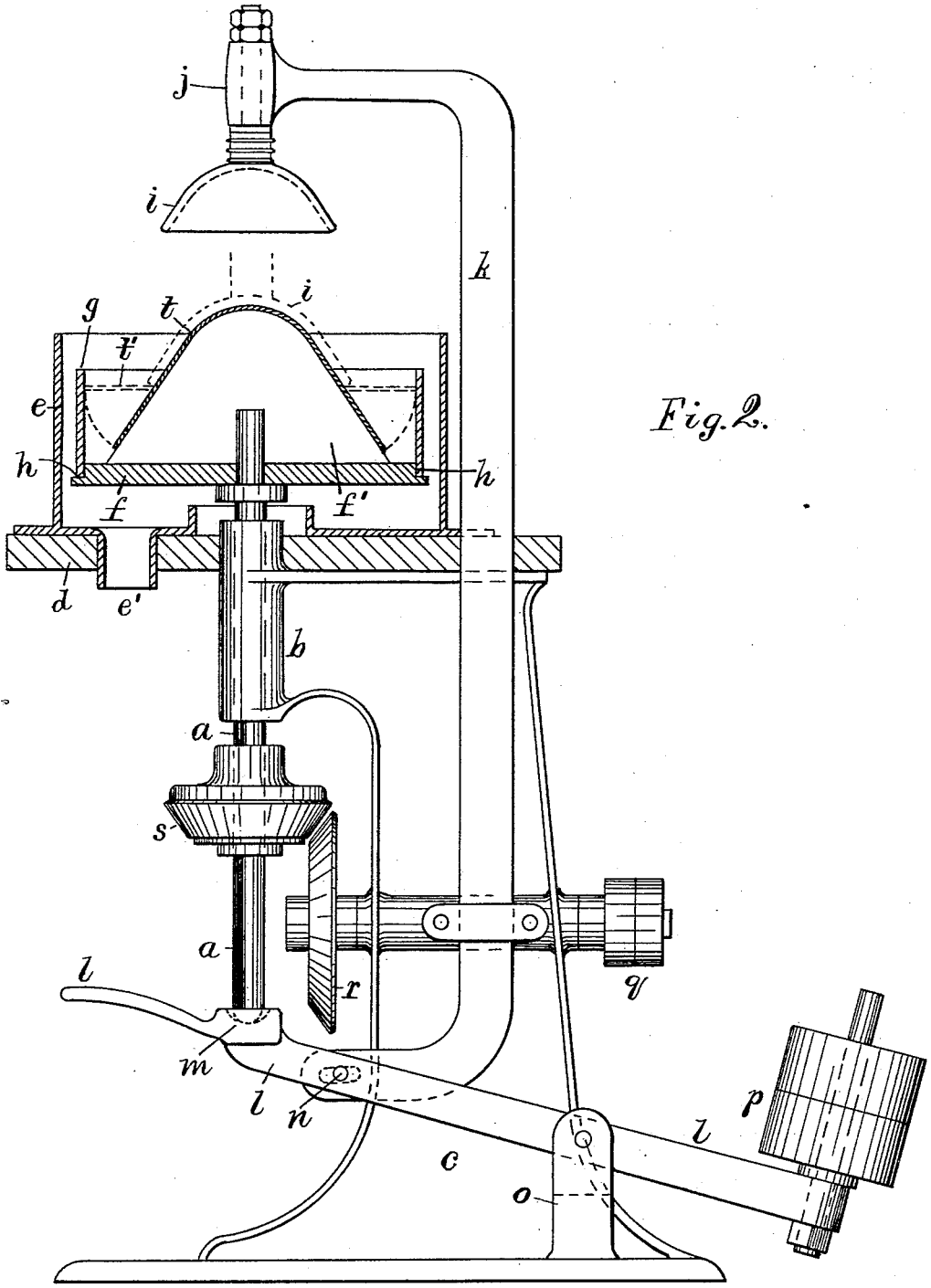
Figure 3:
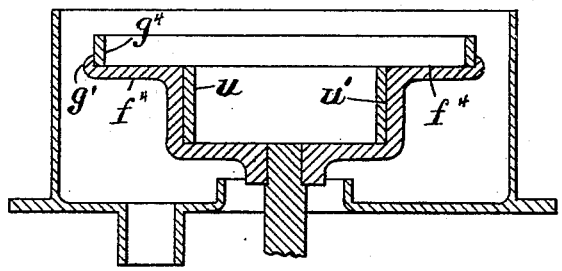
Figure 4:
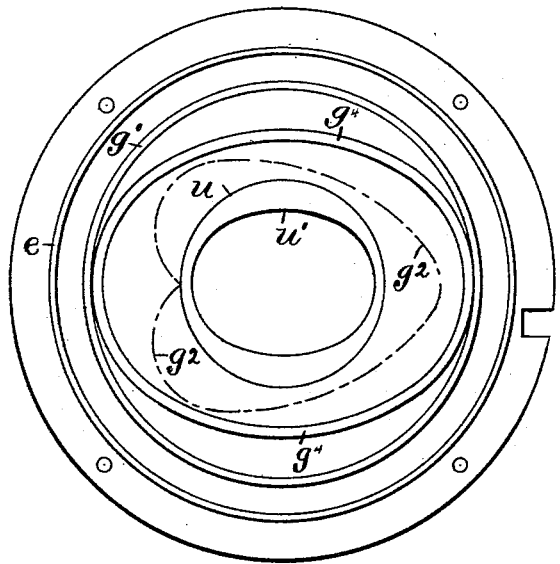

In the annexed drawings, Figure 1 is a plan of a centrifugal hat-drying machine; Fig. 2, an elevation of the same, with the curb, the table, and the hat-block in section at the center line. Fig. 3 is a central vertical section of the curb inclosing a carrier of alternative form. Fig. 4 is a plan of the same, showing the rim on the carrier of oval form, with dotted lines indicating another shape for the rim.

$a$ is the carrier-spindle, and $b$ a bearing for the same, mounted upon a frame $c$.

$d$ is a table on the top of the frame, carrying the curb $e$, with outlet $e'$, within which the carrier $f$ is rotated by means of the spindle.

In Fig. 2 the carrier $f$ is shown with a conical hat-block $f'$ in the center, adapted to receive a conical hat-body and provided with a detachable rim or vertical shell $g$, fitted upon a rabbet $h$ around the bottom of the carrier. A hollow cap-like socket $i$ is sustained movably over the block $f'$ upon a spindle journaled in a bearing $j$ upon a goose-neck bar $k$, which is pivoted to a pin $n$ upon a treadle-lever $l$. A driving-shaft with pulleys $q$ is journaled in the frame and carries a friction-wheel $r$, adjacent to a friction-pulley $s$ upon the spindle $a$, and the treadle is furnished with a step $m$ at its front end, fitted to the lower end of the spindle $a$. The spindle is sustained in its rotations entirely by the bearing $b$, and its lower end is fitted to the step upon the treadle only to permit the lifting of the spindle when it is desired to disengage the friction wheel and pulley. The treadle is pivoted to a bearing $o$ upon the frame and is furnished at the rear end with weight $p$ to overbalance the loads upon the spindle $a$ and bar $k$.

In Fig. 2 the spindle $a$ is shown lifted by the weight $p$, with the pulley $s$ clear from the wheel $r$. The latter may therefore be rotated continuously and the motion of the carrier be stopped by removing the foot from the front end of the treadle $l$. A hat-body $t$ is shown upon the block $f'$, and the treadle is arranged to press the bearing $j$ downward with the socket $i$ upon the hat-body. The socket $i$ is rotated by frictional contact with the hat-body. The edge of the socket extends to the band of the hat, and the effect of rotating the body, when softened by steam or water, is not only to dry the body, but to throw the brim outward into flat form, as indicated by the dotted lines $t'$. The socket operates to restrain the crown of the hat during the wringing operation and to limit the area which is expanded into a flat shape to form the brim of the hat. The brim is prevented from irregular or undue extension by the rim $g$, which is proportioned to shape and gage the edge of the brim to the required dimensions.

In the manufacture of hats from flat bodies, as claimed in an application, Serial No. 408,905, filed October 16, 1891, pending herewith, it is obvious that the flat body cannot be centered by fitting over a hat-block like the conical body shown in Fig. 2, and the use of a rim upon the carrier furnishes a most convenient means for preventing the displacement of the hat-body, while also operating, as already described, to gage and shape the edge of the same. The carrier for such purpose may be formed entirely flat where a flat disk only is to be dried; but where the bodies have crowns it may be formed with a socket $u$ in the middle to admit the crown, as shown in Fig. 3.

In applying the hat-body the crown would be turned in an opposite direction from that upon the body shown in Fig. 2 and would be held in the socket merely by its weight and the expansion of the crown against the side of the socket during the wringing operation.

The carrier is shown in Fig. 4 with oval rim $g^4$, adapted to fit or to shape an oval edge upon the hat-brim. Such rims may be made detachable, so that various sizes of rims may be used with the same carrier. Such rims may be made with a flange to set within a circular bead $g'$, as shown upon the carrier in Figs. 3 and 4, to hold it in place when in operation.

The socket $u$ is shown circular in Fig. 4, with a lining $u'$ of oval shape, adapted to fit snugly upon the band of a hat-body to prevent the distortion of the same, while wet, by the rapid motion of the carrier. Such linings $u'$ may also be made removable and changeable to adapt the same carrier for operating upon hats of all sizes.

A heart-shaped dotted outline $g^2$ is shown in Fig. 4 to indicate a modification of form in which the rim may be applied to the carrier. Rims of any other contour may obviously be applied to the carrier for fancy shapes of ladies' hats, the rim being made to shape the edge of the brim during the wringing operation in any desired form, thus securing uniformity of shape, while the rim also prevents the distortion of the brim while wet and flexible.

In operating upon oval flat bodies the engagement of the oval rim $g^4$ with the edge of the body operates to hold and rotate the body when placed within such rim and without the use of any separate clamp, cap, or socket, like the socket $i$. (Shown in Fig. 2.)

By the use of the socket $u$ or lining $u'$, fitted accurately to the hat-crown, and the rim $g^4$, fitted in like manner to the edge of the brim, a large series of hats may be dried of perfectly-uniform dimensions, and much subsequent labor thus be obviated which is now required to produce such uniformity by other means.

It has been common heretofore in hat-wringing machines to form a cage adapted to receive the crown of the hat; but hats wrung in such a device are not brought to the exact shape desired, as in our construction, but require considerable subsequent treatment, which is avoided by our invention. To secure the results required in our apparatus, it is necessary that the parts which gage the crown or brim of the hat should be made detachable, as shown in the rim $g$ and the socket $u$ in Figs. 3 and 4, whereby the exact size which is desired may be secured. We hereby disclaim a mere cage to receive a hat-crown in the wringing operation.

It will be observed that the socket $i$ performs exactly the same function in holding the crown of the hat and forming the band as the socket $u$, (shown in Fig. 3,) the crown of the hat being turned upward in one case and downward in the other.

From the above description it will be seen that the rim upon the carrier is provided to resist the expansion of the hat-body which is due to the centrifugal force, and thus operates as the different parts of the hat-body are successfully expanded (owing to the different density of the material) to restrain the same from any further expansion and to thus secure a uniformity of size and shape in a series of such bodies. We are not aware that a rim has ever performed an analogous function in any machine used in hat manufacture, nor that any hat-wringing machine has ever been provided with means to determine exactly the size of the crown or brim, so as to produce a series of hat-bodies of uniform size. In the manufacture of flat hat-bodies the felt is first sized into a flat disk of round or oval shape; and this invention is especially applicable to the drying of such flat oval bodies, as it secures a perfect uniformity of size, which greatly facilitates their subsequent treatment.

Having thus set forth the invention, what is claimed is—

1. In a hat-wringing machine, the combination, with a spindle and means for rapidly rotating and stopping the same at pleasure, of a carrier attached to the spindle and provided with a vertically-projecting rim at the outer periphery of the carrier to shape the edge of the hat-body, and a curb surrounding the carrier to retain the water discharged from the same, as set forth.

2. In a hat-wringing machine, the combination, with a spindle and means for rapidly rotating and stopping the same at pleasure, of a carrier attached to the spindle and provided with a vertically-projecting rim at the outer periphery of the carrier, held detachably upon the carrier to shape the edge of the hat-body, and a curb surrounding the carrier to retain the water discharged from the same, as set forth.

3. In a hat-wringing machine, the combination, with a spindle and means for rapidly rotating and stopping the same at pleasure, of a carrier attached to the spindle and provided with a vertically-projecting rim at the outer periphery of the carrier to shape the edge of the hat-body, and a socket pressed upon the hat-body and adapted to shape the crown at the band and to limit the area expanded in the brim, substantially as set forth.

4. A hat-wringing machine consisting in the frame $c$, carrying the bearing $b$ and curb $e$, the driving-spindle having pulleys $q$ and friction-wheel $r$, the carrier-spindle $a$, having friction-pulley $s$ and carrier $f$, with vertically-projecting rim at the outer periphery of the carrier attached thereto, the hat-block $f'$ upon the carrier, the bar $k$, provided with bearing $j$ and rotary socket $i$, and the treadle $l$, provided with weight $p$ and step $m$, fitted to spindle $a$, and pivoted to the bar $k$, as set forth.

In testimony whereof we have hereunto set our hands in the presence of two subscribing witnesses.

GEORGE YULE.
WILLIAM A. BAGLIN.

Witnesses:
THOS. S. CRANE,
JOSEPH PHELPS.

Correction in Letters Patent No. 483,823.

It is hereby certified that in Letters Patent No. 483,823, granted October 4, 1892, upon the application of George Yule, of Newark, New Jersey, and William A. Baglin, of New York, N. Y., for an improvement in "Machines for Wringing Hats," an error appears in the printed specification requiring the following correction, viz.: In line 100, page 2, the word "successfully" should read *successively;* and that the said Letters Patent should be read with this correction therein that the same may conform to the record of the case in the Patent Office.

Signed, countersigned, and sealed this 11th day of October, A. D. 1892.

[SEAL.]

CYRUS BUSSEY,
*Assistant Secretary of the Interior.*

Countersigned:
W. E. SIMONDS,
*Commissioner of Patents.*